July 12, 1938.   J. BYSTRICKY   2,123,451
LUBRICATING APPARATUS
Filed July 20, 1936
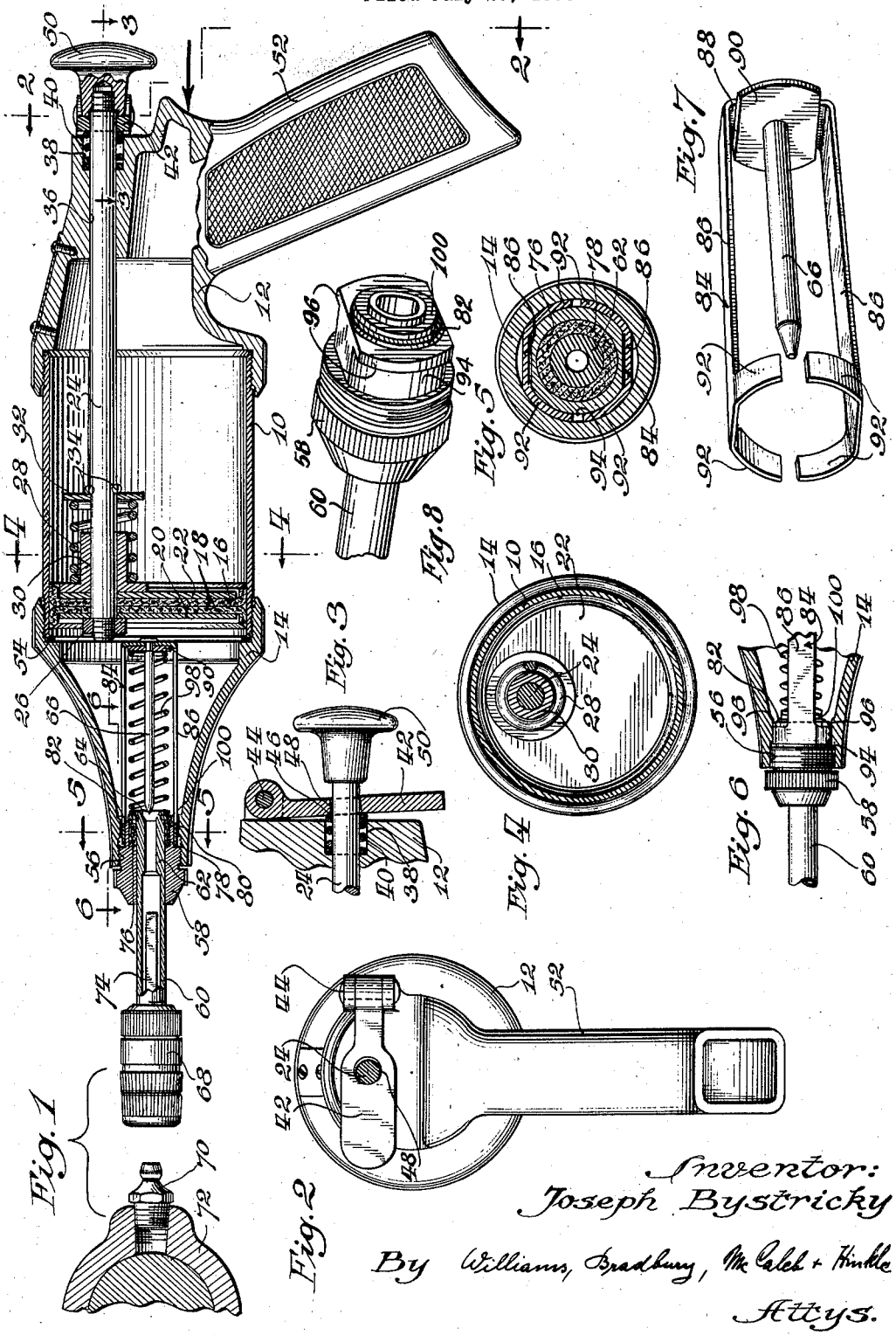
Inventor:
Joseph Bystricky
By Williams, Bradbury, McCaleb + Hinkle
Attys.

Patented July 12, 1938

2,123,451

UNITED STATES PATENT OFFICE 2,123,451

LUBRICATING APPARATUS

Joseph Bystricky, Chicago, Ill., assignor to Stewart-Warner Corporation, Chicago, Ill., a corporation of Virginia Application July 20, 1936, Serial No. 91,467

8 Claims. (Cl. 221—47.4)

My invention relates generally to a lubricating apparatus and more particularly to improvements in lubricant compressors or grease guns used in high pressure lubricating systems.

It is an object of my invention to provide an improved manually operated lubricant compressor of the pistol grip type, in which the handle for the operation of the gun is located near the axis of the high pressure piston and cylinder, so that substantially all of the force applied to the handle will be effectively directed for the operation of the compressor.

A further object is to provide an improved high pressure piston and cylinder assembly for lubricant compressors.

A further object is to provide an improved lubricant compressor in which the follower piston is guided and advanced by a stem located eccentric to the piston.

Other objects will appear from the following description, reference being had to the accompanying drawing, in which Fig. 1 is a central longitudinal sectional view of a grease gun together with a coupler and fitting shown in elevation;

Fig. 2 is a vertical sectional view taken on the line 2—2 of Fig. 1;

Fig. 3 is a fragmentary sectional view taken on the line 3—3 of Fig. 1;

Figs. 4 and 5 are transverse sectional views taken on the lines 4—4 and 5—5, respectively, of Fig. 1;

Fig. 6 is a horizontal sectional view taken on the line 6—6 of Fig. 1; and

Fig. 7 is a perspective view of the high pressure plunger and its supporting frame.

Fig. 8 is a perspective view of the inner end of the high pressure cylinder and the guide therefor.

The lubricant compressor or grease gun of my invention is of the type in which the connection of the gun with a lubricant receiving fitting and the operation of the high pressure pumping mechanism is effected by pushing the lubricant compressor against the fitting, and comprises a cylindrical barrel 10 having a handle casting 12 threaded at the rear end thereof, and a cap 14 threaded at the forward end thereof. Within the barrel 10 is a follower piston 16 comprising a pair of opposed cup leathers 18 held between a face plate 20 and a backing plate 22. The piston 16 is mounted upon a piston rod 24 which, at its inner extremity, is threaded for a nut 26, the latter forming a stop for limiting forward (leftward, Fig. 1) movement of the piston. The piston is normally urged to move forwardly to a position abutting the stop 26 by a relatively strong compression coil spring 28 which encircles a flanged guide 30 and is seated against a washer 32 held against rearward movement on the piston rod 24 by a plurality of ears 34 struck from the rod.

The piston rod 24 is slidable in a relatively long bearing formed by a bore 36 formed in the handle casting, the outer end of the bore 36 being counterbored at 38 to provide a recess for a compression coil spring 40. The spring 40 engages a latch 42 pivoted at 44 (Fig. 3) and normally swings the latter to the position in which it is shown in Fig. 3 wherein the edge 46 of the latch formed by a hole 48 through which the piston rod passes, grips the piston rod to lock it against rearward or outward movement. A knob 50 is threaded to the end of the piston rod 24.

It will be noted that the piston rod is eccentric of the axis of the barrel 10 and of the piston 16. This construction makes it possible to locate the handle 52 formed integrally with the casting 12 in a position such that the resultant of the forces applied when pushing the grease gun against a fitting in normal operation of the gun will be applied to the handle at substantially the point indicated by the arrow in Fig. 1. Thus, it will be seen that substantially all of the applied force will be directed in line with the axis of the barrel 10 and that there will be a negligible component of force at right angles to the axis of the barrel.

The cap 14 is threaded to the end of the barrel 10, a suitable gasket 54 being interposed between the cap and the end of the barrel to seal the connection. The cap is of generally conical shape and its outer end is internally threaded at 56 to receive a guide 58 for a high pressure cylinder 60. The high pressure cylinder has a portion 62 of reduced internal diameter and is flared at its inner end as indicated at 64, to facilitate entrance of the end of the high pressure plunger 66. A coupler 68 is secured to the outer end of the cylinder 60 and is provided with means for making a quick-detachable lubricant tight connection with a fitting 70, threaded in a bearing 72. The coupler may be of any preferred construction, such, for example, as shown in the patent to Joseph Bystricky, No. 2,016,809, granted October 8, 1935.

A filler 74 in the form of a polygonal shaped rod may be provided within the cylinder 60 to reduce its volumetric capacity, thereby facilitating the priming of the cylinder.

The guide 58 is counterbored at 76 to receive a packing 78 and packing washer 80, which are retained by a crimped flange 82.

The high pressure plunger assembly comprises a metal stirrup 84 which has a pair of arms 86 connected by a portion 88 to which a washer 90 is riveted by means of the plunger 66. The forward ends of the arms 86 are provided with arcuate fingers 92 which are adapted to fit in an annular groove 94 formed in the guide 58 by means of a pair of flanges 96. A compression coil spring 98 has its inner end abutting against the washer 90 and its outer end seated against a washer 100, which is held in a suitable groove formed in the external surface of the cylinder 60 adjacent its inner end.

It will be noted from Fig. 1 that the arms 86 of the stirrup 84 are held with their fingers 92 encircling the guide 58 by the adjacent inner surface of the cap 14. The fingers 92 are thus held behind the flanges 96. The guide 58, cylinder 60, plunger 66, stirrup 84, and spring 98, and their connected parts thus form a unitary assembly which may readily be removed from the lubricant compressor by unscrewing the guide 58. Thus, upon breakage of any of these parts, their removal and replacement can be very easily accomplished.

In using the lubricant compressor of my invention, the cap 14 is removed, the end of the barrel immersed in a supply of grease (if the gun is to be used with this lubricant), and the follower withdrawn into the barrel 10 by releasing the latch 42 and pulling upon the knob 50. The grease will thereupon be forced into the barrel of the compressor by atmospheric pressure. If oil is to be used as the lubricant, the follower piston 16 is, of course, first withdrawn into the barrel 10, whereupon the oil may be poured into the barrel.

Having filled the barrel with grease or oil, the cap 14 will be replaced and the follower piston 16 advanced by pressing inwardly upon the knob 50 of the piston rod 24, whereupon when the lubricant pressure within the barrel 10 affords the sufficient resistance, the spring 28 will be compressed and thus retain the lubricant in the barrel under low pressure, since outward movement of the piston rod 24 will be prevented by the latch 42.

The priming pressure thus produced will cause lubricant to flow into the high pressure cylinder 60 to prime the latter. The stirrup arms 86 and the spring 88 provide adequately large passageways for the flow of the lubricant into the high pressure cylinder so that the priming of the cylinder will be rapid and complete. Upon attaching the coupler 68 to a lubricant receiving fitting and pushing the lubricant compressor toward the fitting, the guide 58 will slide relative to the high pressure cylinder and the plunger 66 will slide into and through the reduced diameter portion 62 of the high pressure cylinder, in which portion the plunger has a relatively close sliding fit. As the plunger 66 enters the cylinder 60, the lubricant in the latter will be forced through the coupler 68 and fitting 70 into the bearing to be lubricated. The coupler 68 is provided with means to retard return flow and as a result, upon the completion of the discharge stroke, when the spring 98 retracts the plunger 66 from the cylinder, a partial vacuum will be formed in the cylinder which will facilitate repriming the high pressure cylinder.

Due to the fact that the force manually applied to the lubricant compressor is directed substantially along its axis, there will be no tendency of the high pressure cylinder 60 to bind in the guide 58, and the wear upon these parts will be very much less than in grease guns previously used wherein the handle was offset a considerable distance from the axis of the compressor. Furthermore, substantially all of the manually applied force will be usefully employed in applying pressure to the lubricant in the high pressure cylinder, and the compressor will therefore operate much more easily than compressors of the same general type formerly in use.

As previously stated, the high pressure plunger and cylinder assembly makes it possible to easily replace these parts, should they become worn or broken, and this may be accomplished merely by unscrewing the guide 58, whereupon the stirrup 84 with the plunger 66 may readily be removed from the guide by slightly spreading the arms 86 of the stirrup to remove the arcuate fingers 92 thereof from behind the flanges 94. It will be noted that the piston rod 24 is provided with a relatively long bearing 36 and that the follower piston guide 30 likewise has a long bearing upon the piston rod, so that the follower piston will not bind in the barrel 10, but will be moved freely by the spring 28 to maintain the lubricant under the desirable priming pressure.

While I have shown and described a particular embodiment of my invention, it will be apparent to those skilled in the art that various modifications in design and construction may be made without departing from the spirit of my invention.

What I claim as new and desire to secure by Letters Patent of the United States, is:

1. In a high pressure lubricant compressor, the combination of a barrel forming a low pressure cylinder, high pressure pumping means secured to said barrel and operable by longitudinal movement of the barrel with respect to a lubricant receiving part, a follower piston reciprocable in said barrel, a guiding rod for said piston, said rod being located appreciably eccentric of the axis of said follower piston and eccentric of the axis of said barrel, and a handle casting secured to said barrel at the end opposite to said pumping means, said handle casting having a bearing for said rod and having a handle portion with a gripping part in substantial alignment with said pumping means, whereby a force in a line substantially co-axial with said means may be easily manually applied to the compressor through said handle portion.

2. In a lubricant compressor, a barrel, a cap for said barrel, said cap having a threaded opening therein, a reciprocable cylinder, a guide for said cylinder, said guide being screwed into said threaded opening, a plunger cooperable with said cylinder, a member secured to said plunger for supporting the same in substantially axial alignment with said cylinder, said member having a part held interlocked with said guide by said cap, and a spring compressed between said cylinder and said member to move said cylinder outwardly with respect to said plunger.

3. In a high pressure lubricant compressor, the combination of a member having a threaded opening therein, a high pressure cylinder, a guide screwed in said opening and having a bore forming a bearing for said cylinder, said guide having radial projections, a plunger cooperable with said cylinder, a support for said plunger, said support having parts detachably interlocking with said projections of said guide and held in interlocking relationship therewith by said member, and a spring held between said support and said cylinder.

4. A hand-operated, portable, high pressure lubricant compressor comprising, a barrel forming a lubricant reservoir, a handle secured to one end of said barrel, said handle being positioned relative to said barrel so that a force acting in substantial alignment with said barrel may be transmitted to said barrel through said handle, a follower piston in said barrel, a rod slidably mounted in said handle and forming a guide for said piston, said rod being eccentric of the axis of said barrel, and a high pressure cylinder and plunger secured to the end of said barrel opposite said handle and forming means to discharge lubricant from said barrel under high pressure, said cylinder and plunger being in substantial alignment with said barrel.

5. In a high pressure lubricant compressor, the combination of a barrel having a threaded opening at one end thereof, a guide threaded in said opening and having a pair of radially outwardly projecting flanges at the end thereof inserted in said barrel, a cylinder reciprocable in said guide, a plunger cooperable with said cylinder to eject lubricant therefrom, and a support for said plunger, said support having a pair of arms embracing said guide and held against longitudinal movement with respect thereto by having portions interlocking behind said flanges on said guide.

6. A high pressure lubricant compressor comprising a lubricant barrel having a reduced diameter bore at one end thereof, the outer portion of said bore being internally threaded, a guide threaded in said bore, a cylinder reciprocable in said guide, a stirrup having its ends interlocked against longitudinal movement with respect to said guide and held against radial movement with respect thereto by the walls of said bore, a plunger carried by said stirrup and cooperable with said cylinder, and a spring compressed between said stirrup and said cylinder to force said cylinder away from said plunger, 7. In a high pressure lubricant compressor, the combination of a barrel forming a low pressure cylinder, high pressure pumping means secured to said barrel and operable by longitudinal movement of the barrel with respect to a lubricant receiving part, a follower piston reciprocable in said barrel, a guiding rod for said piston, a stop at the inner end of said rod, a spring compressed between said piston and said rod and urging said piston against said stop, said rod being located appreciably eccentric of the axis of said follower piston and eccentric of the axis of said barrel, a handle casting secured to said barrel at the end opposite to said pumping means, said handle casting having a bearing for said rod and having a handle portion with a gripping part in substantial alignment with said pumping means, whereby a force in a line substantially coaxial with said means may be easily manually applied to the compressor through said handle portion, and a latch for said guiding rod, said latch being located adjacent said handle.

8. A high pressure pumping unit for lubricant compressors comprising a guide bushing having a bore and a threaded portion adapted for threaded engagement with a lubricant compressor, a high pressure cylinder reciprocable in said bore, a plunger cooperable with said cylinder, and means for supporting said plunger in alignment with said cylinder, said means and said bushing having detachably interlocking parts to hold said plunger rigidly in position with respect to said cylinder, said supporting means and said interlocking parts being of lesser diameter than the threaded portion of said bushing, whereby said supporting means may be inserted in a lubricant compressor through the hole in which the bushing is to be threaded, said interlocking parts being effective to hold said supporting means against longitudinal movement with respect to said bushing and being capable of detachment by radial outward movement of portions of said supporting means.

JOSEPH BYSTRICKY.